United States Patent
Hong et al.

(10) Patent No.: US 11,563,888 B2
(45) Date of Patent: Jan. 24, 2023

(54) IMAGE OBTAINING AND PROCESSING APPARATUS INCLUDING BEACON SENSOR

(71) Applicant: Hanwha Techwin Co., Ltd., Seongnam-si (KR)

(72) Inventors: Jung Bin Hong, Seongnam-si (KR); Jeong Woong Park, Seongnam-si (KR); Byeoung Wook Lee, Seongnam-si (KR); Ju Young Im, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/139,499

(22) Filed: Sep. 24, 2018

(65) Prior Publication Data

US 2019/0098206 A1   Mar. 28, 2019

(30) Foreign Application Priority Data

Sep. 25, 2017   (KR) .................. 10-2017-0123659
Apr. 9, 2018    (KR) .................. 10-2018-0041251

(51) Int. Cl.
   *H04N 5/232*   (2006.01)
   *H04N 5/907*   (2006.01)
   (Continued)

(52) U.S. Cl.
   CPC ........... *H04N 5/23229* (2013.01); *G01S 1/68* (2013.01); *G01S 5/0264* (2020.05);
   (Continued)

(58) Field of Classification Search
   None
   See application file for complete search history.

(56) References Cited

U.S. PATENT DOCUMENTS 6,628,899 B1 * 9/2003 Kito .................. H04N 1/00132
                                                      348/207.1
7,747,574 B1 * 6/2010 Svendsen ............. G06F 16/113
                                                        707/661
(Continued)

FOREIGN PATENT DOCUMENTS

JP       2014225831 A * 12/2014  ............. H04N 5/232
KR  10-2011-0092502 A    8/2011
(Continued)

OTHER PUBLICATIONS

Kato Yoshiyuki; Imaging Control Device, Mobile Apparatus, Photographing System, Imaging Control Method, and Program; JP-2014225831-A; Dec. 2014; English Translation; pp. 1-18 (Year: 2014).*

(Continued)

*Primary Examiner* — Cynthia Segura
(74) *Attorney, Agent, or Firm* — McLean IP Global; Jason Y. Pahng

(57) ABSTRACT

Provided is a monitoring system including an image obtaining apparatus and an image processing apparatus. The image obtaining apparatus includes: a camera; a beacon sensor; a processor configured to match beacon information obtained by detecting, by the beacon sensor, a beacon attached to an object existing in a monitoring region, to an image of the monitoring region captured by the camera; and a memory storing the image matched with the beacon information.

16 Claims, 12 Drawing Sheets

(51) Int. Cl.
  *H04W 4/029* (2018.01)
  *G06F 16/58* (2019.01)
  *H04N 5/77* (2006.01)
  *G01S 1/68* (2006.01)
  *H04N 7/18* (2006.01)
  *G01S 5/02* (2010.01)

(52) U.S. Cl.
  CPC ..... *G06F 16/5866* (2019.01); *H04N 5/23218* (2018.08); *H04N 5/23296* (2013.01); *H04N 5/23299* (2018.08); *H04N 5/77* (2013.01); *H04N 5/907* (2013.01); *H04N 7/181* (2013.01); *H04W 4/029* (2018.02)

(56) References Cited

U.S. PATENT DOCUMENTS

| | | | |
|---|---|---|---|
| 8,817,118 B2 * | 8/2014 | Hatanaka | H04N 1/00204 348/143 |
| 2005/0044258 A1 * | 2/2005 | Nakamura | H04L 29/06 709/232 |
| 2007/0003113 A1 * | 1/2007 | Goldberg | G03D 15/001 382/118 |
| 2008/0002031 A1 * | 1/2008 | Cana | G01S 5/0027 348/208.14 |
| 2008/0225137 A1 * | 9/2008 | Kubo | H04N 5/23203 348/231.2 |
| 2010/0007738 A1 * | 1/2010 | Lehnert | H04N 7/181 348/159 |
| 2010/0245588 A1 * | 9/2010 | Waehner | G01S 3/781 348/169 |
| 2011/0013032 A1 * | 1/2011 | Hatanaka | H04N 1/00204 348/211.4 |
| 2011/0074547 A1 * | 3/2011 | Seshadri | G01S 1/68 340/8.1 |
| 2016/0189514 A1 * | 6/2016 | Todasco | G08B 21/02 340/8.1 |
| 2016/0277601 A1 * | 9/2016 | Seymour | G08G 1/04 |
| 2016/0300285 A1 * | 10/2016 | Gandhi | G06Q 30/0623 |
| 2017/0118446 A1 * | 4/2017 | Lee | H04N 5/77 |
| 2018/0077546 A1 * | 3/2018 | Arunachalam | H04W 4/80 |
| 2018/0088339 A1 * | 3/2018 | Aruga | G01S 19/48 |
| 2019/0205078 A1 * | 7/2019 | Sueki | G06F 3/147 |

FOREIGN PATENT DOCUMENTS

| | | |
|---|---|---|
| KR | 10-1684836 B1 | 12/2016 |
| KR | 10-2017-0011755 A | 2/2017 |
| KR | 10-2017-0048006 A | 5/2017 |
| KR | 10-1736311 B1 | 5/2017 |
| KR | 10-1743730 B1 | 6/2017 |
| KR | 10-2017-0087223 A | 7/2017 |

OTHER PUBLICATIONS

Communication dated Nov. 9, 2017 by the Korean Intellectual Property Office in counterpart Korean Patent Application No. 10-2017-0123659.

Communication dated Feb. 5, 2018 by the Korean Intellectual Property Office in counterpart Korean Patent Application No. 10-2017-0123659.

* cited by examiner

IMAGE OBTAINING AND PROCESSING APPARATUS INCLUDING BEACON SENSOR

CROSS-REFERENCE TO THE RELATED APPLICATIONS

This application claims priority from Korean Patent Application No. 10-2017-0123659 filed on Sep. 25, 2017, and Korean Patent Application No. 10-2018-0041251 filed on Apr. 9, 2018, in the Korean Intellectual Property Office, the disclosures of which are incorporated herein in their entirety by reference.

BACKGROUND

1. Field

Apparatuses consistent with exemplary embodiments of the inventive concept relate to a monitoring system including an image obtaining apparatus, an image processing apparatus, and a user terminal.

2. Description of the Related Art

The development of various algorithms for tracking objects appearing in images captured using cameras and the advancement of image security systems using such object tracking algorithms are becoming more prominent. Such image security systems identify an object from an image with respect to a monitoring space, and support tracking of continuously moving objects in an image in the monitoring space by using various object tracking algorithms.

SUMMARY

Exemplary embodiments provide a monitoring system capable of efficiently monitoring a monitoring target by providing a location of a monitoring target approaching a camera and information with respect to a situation in which the monitoring target is in, and a method of controlling the monitoring system.

The exemplary embodiments are not limited to the above-described problems, and other problems may be addressed from the following exemplary embodiments.

According to exemplary embodiments, there is provided an image obtaining apparatus which may include: a camera; a beacon sensor; a processor configured to match beacon information with an image of a monitoring region captured by the camera, wherein the beacon information is obtained by detecting, by the beacon sensor, a beacon attached to an object existing in the monitoring region; and a memory configured to store the image matched with the beacon information.

The processor may generate an event when a registered beacon is detected based on the beacon information, and transmit, to an external apparatus, an image matched with the beacon information corresponding to the registered beacon.

The beacon information may include information about a distance between the image obtaining apparatus and the beacon.

The processor may transmit beacon information corresponding to the detected the beacon to another image obtaining apparatus.

The processor may back up at least a portion of the image stored in the memory in to an external apparatus, at fixed time periods.

The processor may back up at least a portion of the image stored in the memory to an external apparatus, when the image stored in the memory exceeds a preset storage capacity.

The processor may control a direction of the camera such that the camera captures an image of a region where a registered beacon is located, when the detected beacon is a registered beacon.

The processor may set a priority to the beacon and controls a direction of the camera such that an image of the monitoring region is captured according to the priority.

The processor may match information about the beacon, existing in a second region, with a first image which an image of a first region and a second image which is an image of a second region in which the beacon is located, captured by the camera.

The processor may receive an image request from an image processing apparatus, and transmit the second image matched with the beacon information corresponding to condition information included in the image request.

The processor may store an image, which is not matched with the beacon information, from among captured images of the monitoring region, in the external storage apparatus.

According to exemplary embodiments, there is provided an image processing apparatus which may include: a storage apparatus configured to store an image matched with beacon information received from an image obtaining apparatus and store an image which is not matched with beacon information; and a processor configured to receive an image request from a user terminal, request an image corresponding to condition information included in the image request, to the image obtaining apparatus, receive the image matched with the beacon information corresponding to the condition information, from the image obtaining apparatus, and transmit, to the user terminal, the image matched with the beacon information corresponding to the condition information.

The processor may provide a map including a place corresponding to a background of the image matched with beacon information on a display screen, and display a beacon corresponding to the condition information in the map.

The processor may display a beacon corresponding to the condition information and at least one another beacon around the beacon corresponding to the condition information, on the map, wherein the beacon corresponding to the condition information and at least one another beacon are distinguished by at least one of a size, a shape, and a color.

The processor may receive a first image from an external storage apparatus outside the image obtaining apparatus, and receive a second image from the image obtaining apparatus, wherein the first image is an image of a preset first region captured by the image obtaining apparatus and stored in the external storage apparatus, and wherein the second image is an image captured by the image obtaining apparatus in a direction facing a beacon existing in the first region and stored in the internal memory of the image obtaining apparatus.

The processor may transmit at least one of the first image and the second image to the user terminal According to exemplary embodiments, there is provided a user terminal which may include: a processor configured to transmit an image request including condition information to an image processing apparatus, and receives, from the image processing apparatus, an image matched with beacon information corresponding to the condition information, from among images matched with beacon information which are transmitted from at least one image obtaining apparatus to the image processing apparatus, wherein the processor is further configured to provide a map corresponding to a background of the image matched with the beacon information to a display, and displays a tag based on the beacon information of the image matched with the beacon information on the map.

The processor may provide a list of images matched with the beacon information corresponding to the condition information to a display screen, and provide an image selected from the list to the display in a reproducible format.

The processor may receive a tag selecting signal and provide tag information around a selected tag.

According to exemplary embodiments, there is provided an image obtaining apparatus which may include: a camera arranged at a fixed position and configured to capture a first image of a first region; a beacon sensor configured to detect a beacon attached to an object existing in a second region by receiving a beacon signal from the beacon; a processor configured to control the camera to capture a second image of a second region in response to the beacon sensor detecting the beacon, generate beacon information based on the beacon signal, and tag the beacon with the second image based on the beacon information; and a memory configured to store the second image tagged with the beacon.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
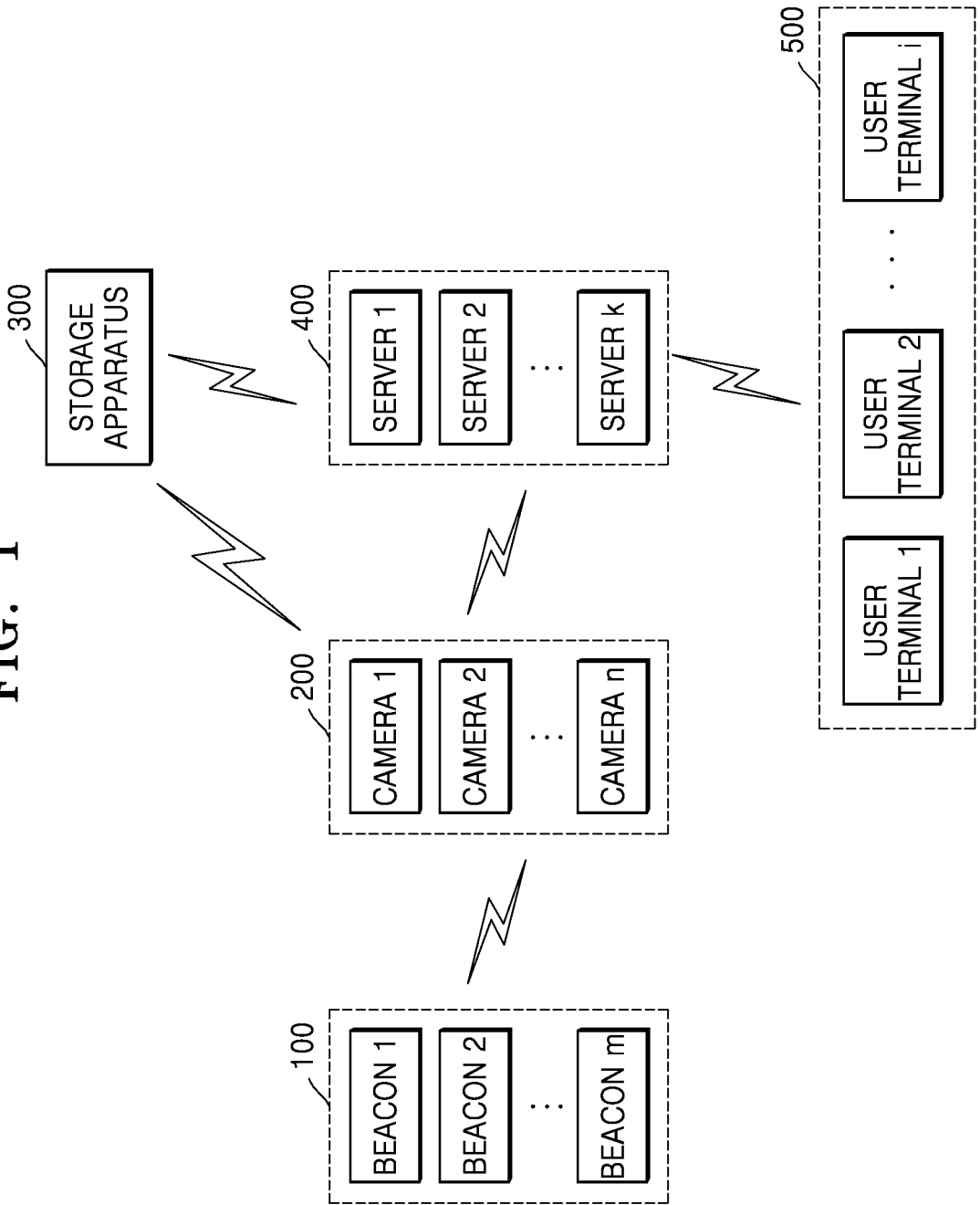
FIG. 1 is a block diagram of a monitoring system according to an exemplary embodiment.

Reference will now be made in detail to exemplary embodiments which are illustrated in the accompanying drawings, wherein like reference numerals refer to like elements throughout. In this regard, the presented embodiments may have different forms and should not be construed as being limited to the descriptions set forth herein. Accordingly, the exemplary embodiments are merely described below, by referring to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The following description exemplifies only the principles of the inventive concept. Even if they are not described or illustrated clearly in the present specification, those of ordinary skill in the art can embody the principles of the inventive concept and invent various apparatuses within the inventive concept. The use of the conditional terms and exemplary embodiments presented herein are intended only to make the inventive concept understood, and they are not limited to the exemplary embodiments and conditions mentioned herein. In addition, all the detailed description on the principles, viewpoints and exemplary embodiments and particular embodiments of the inventive concept should be understood to include structural and functional equivalents to them. The equivalents include not only currently known equivalents but also those to be developed in future, that is, all devices invented to perform the same function, regardless of their structures.

Therefore, functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared. The apparent use of a term, 'processor', 'control' or similar concept, should not be understood to exclusively refer to a piece of hardware capable of running software, but should be understood to include a digital signal processor (DSP), hardware, and read-only memory (ROM), random access memory (RAM) and non-volatile memory for storing software, implicatively. Other known and commonly used hardware may be included therein, too.

The foregoing objects, features, and advantages will be more apparent from the following detailed description made with reference to the accompanying drawings. In the description of the present disclosure, the detailed description of known techniques which might unnecessarily obscure the subject matter of the present disclosure will be omitted or made in brief.

Meanwhile, when a portion is referred to "include" a component, other components are not excluded unless specifically stated otherwise, and the portion may further include other components.

Hereinafter, with reference to the accompanying drawings, the inventive concept according to the exemplary embodiments will now be described in detail.

FIG. 1 is a block diagram of a monitoring system according to an exemplary embodiment.

Referring to FIG. 1, a monitoring system may include at least one beacon 100 (beacon 1 to beacon m), at least one image obtaining apparatus 200 (camera 1 to camera n), a storage apparatus 300, at least one server 400 (server 1 to server k) and at least one user terminal 500 (user terminal 1 to user terminal i).

The beacon 100 is an apparatus configured to transmit and receive data to and from the image obtaining apparatus 200 by short-range communication, for example, based on a Bluetooth low energy (BLE) technique. The beacon 100 may be attached, carried or worn to or by an object, and periodically transmit a beacon signal. The beacon signal may store unique identification information. The identification information may be a manufacture's serial number given at a time of manufacture or an identification symbol set arbitrarily by an administrator. An object wearing the beacon 100 may be a fixed or moving object.

The beacon 100 may insert, in a beacon signal, information about a position of the beacon 100 or information indicating the position of the beacon 100, together with identification information, and transmit the beacon signal. According to an exemplary embodiment, while Bluetooth communication, in particular, the BLE technology is described as being applied as the short-range communication, the short-range communication is not limited thereto, and various short-range communication methods such as an infrared data association, a visible light communication, a human body communication or a mediated communication, a Zigbee communication, a near field communication (NFC), a radio frequency identification (RFID), or the like may be selected and used.

The image obtaining apparatus 200 may be installed in a preset region, may include a camera, a communication interface, and an information processor, and may obtain a first image which is a captured image of a set region. The image obtaining apparatus 200 may include a beacon sensor to receive a beacon signal transmitted by the beacon 100 in the set region to thereby detect the beacon 100.

In an exemplary embodiment, the image obtaining apparatus 200 may tag at least one detected beacon to the first image, and store the beacon-tagged first image in an internal storage apparatus. The image obtaining apparatus 200 may match a beacon characteristic value (beacon identification information) with the first image, and store the same in the internal storage apparatus.

In an exemplary embodiment, the image obtaining apparatus 200 may obtain a second image as an image capturing direction is controlled towards a region where a detected beacon 100 is located, for example, by pan-tilt-zoom (PTZ) control of the image obtaining apparatus 200. The image obtaining apparatus 200 may store the first image in a first storage apparatus, and store the second image in a second storage apparatus. The image obtaining apparatus 200 may tag the beacon 100 to the second image, and store the beacon-tagged second image in the second storage apparatus. The first storage apparatus may be an external storage apparatus 300, and the second storage apparatus may be the internal storage apparatus.

In an exemplary embodiment, a plurality of image obtaining apparatuses 100 may be connected to one another via a network to share information. For example, the image obtaining apparatuses 200 may transmit, receive and share at least one of beacon information and image information.

The storage apparatus 300 may receive and store a first image that is obtained by periodically capturing an image of the set region, from the at least one image obtaining apparatus 200. The storage apparatus 300 may classify and store first images for each image obtaining apparatus 200. The storage apparatus 300 may be implemented using various apparatuses such as a digital video recorder (DVR), a network video recorder (NVR) and a server, but is not limited thereto.

The server 400 may be an image processing apparatus configured to analyze and process an image of the image obtaining apparatus 200 and/or the storage apparatus 300.

The server 400 may register at least one image obtaining apparatus 200, request an image of a preset condition to the image obtaining apparatus 200 and/or the storage apparatus 300, and receive an image satisfying the condition from the image obtaining apparatus 200 and/or the storage apparatus 300. The server 400 may receive an image request of a preset condition from the user terminal 500, receive the image satisfying the condition from the image obtaining apparatus 200 and/or the storage apparatus 300, and provide the image to the user terminal 500.

The server 400 may be constructed in a government office, a police station, a hospital, a master control station, and an all-source situation room, or the like.

The user terminal 500 may register at least one beacon 100 and be linked with the registered beacon 100. The user terminal 500 may request an image related to the registered beacon 100 to the server 400, and receive the related image from the server 400. The user terminal 500 may check a situation of an object carrying the beacon 100 via the received image. The user terminal 500 may receive an image related to an object in real time according to a set-up of a user, or may receive a previously stored image related to the object.

The user terminal 500 may be carried by a guardian such as a family member, a relative or an acquaintance, and include a desktop personal computer (PC), a tablet PC, a slate PC, a notebook computer and a portable terminal such as a Smartphone.

The image obtaining apparatus 200, the storage apparatus 300, the server 400, and the user terminal 500 may be connected through a communication network. The communication network may include a wired network and a wireless network including a short-range communication such as a wireless internet, like a wire network and 3G, 4G (LTE), a WiFi, a WiBro, a WiMAX, and a Bluetooth, a radio frequency identification (RFID), an infrared data association (IrDA), an ultra-wideband (UWB), a Zigbee and a near field communication (NFC). A network for wireless mobile communication may further include a component such as a network base transceiver station (BTS), a mobile switching center (MSC), a home location register (HLR), an access gateway that enables transmission and reception of a wireless packet data, or a packet data serving node (PDSN).

In the exemplary embodiment described above, the storage apparatus 300 and the server 400 are described separately, however, the inventive concept is not limited thereto. The storage apparatus 300 may be configured as a configuration component of the server 400.

Figure 2:
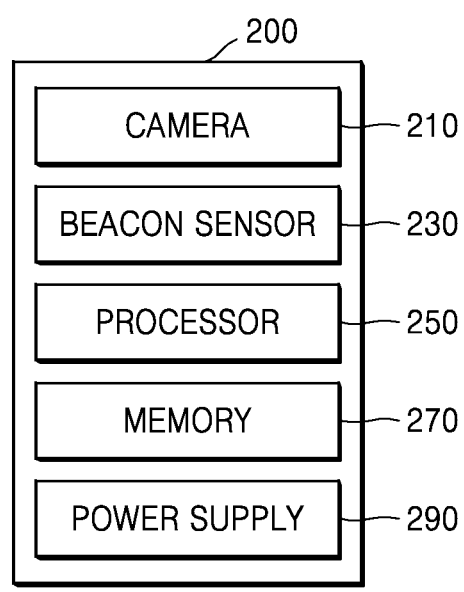
FIG. 2 is a schematic block diagram of a configuration of an image obtaining apparatus according to an exemplary embodiment.

FIG. 2 is a schematic block diagram of a configuration of an image obtaining apparatus 200 according to an exemplary embodiment.

Referring to FIG. 2, the image obtaining apparatus 200 may include a camera 210, a beacon sensor 230, a processor 250, a memory 270 and a power supply 290.

The camera 210 is arranged at a fixed position of a particular location and may be a single fixed camera having a fixed capturing range or a PTZ camera having pan, tilt, and/or zoom functions. The camera 210 may obtain a first image by capturing an image of a preset region (a first region). The camera 210 may receive a PTZ control signal from the processor 250 according to beacon detection, and obtain a second image obtained by capturing an image of a second region of a direction corresponding to a changed PTZ. The second region may include at least a portion of the first region, and may be a region including a position of the beacon 100 existing in the first region.

The camera 210 may capture an image of the first region at all times. The camera 210 may capture an image of the first region at all times, and when the camera 210 receives a control signal from the processor 250 by detecting at least one beacon, the camera 210 may change its posture in a direction based on the control signal, and may obtain the second image by capturing an image of the second region. The camera 210 may return to a mode of capturing an image of the first region at all times when a registered or an appointed beacon leaves the first region.

The beacon sensor 230 may detect at least one beacon 100 by receiving a beacon signal from the at least one beacon 100 existing in the first region.

The processor 250 may generate beacon information based on the received beacon signal. The beacon information may include at least one of identification information about the beacon 100, position information about the beacon 100, time information indicating a time at which the beacon 100 is detected, identification information about the image obtaining apparatus 200, and identification information about the user terminal 500 linked with the beacon 100.

The identification information about the beacon 100 is unique information used to distinguish the beacon 100, and may be, for example, an identifier (ID), a device name, a serial number, and a media access control (MAC) address. The position information may include a distance between the image obtaining apparatus 200 and the beacon 100. The time information may include a time at which the beacon 100 transmitted a beacon signal or a time at which the image obtaining apparatus 200 receives the beacon signal (a time at which a beacon is sensed).

The identification information about the image obtaining apparatus 200 is unique information used to distinguish the image obtaining apparatus 200, and may be, for example, an ID, a device name, the serial number, and a MAC address.

The identification information about the user terminal 500 is unique information used to distinguish the user terminal 500 and may be, for example, an ID, a device name, a serial number, and a MAC address.

The processor 250 may output a PTZ signal as a control signal, to the camera 210, wherein the PTZ signal controls a posture (direction) of the camera 210 such that the camera 210 captures an image of the first region or the second region. The processor 250 may determine a capturing sequence with respect to two or more second regions. The processor 250 may assign a higher priority to a second region corresponding to the registered or the appointed beacon. The processor 250 may set a priority to a second region according to a position of a beacon or a sequence that allows efficient directional control of the camera 210.

The processor 250 may store the first image obtained by using the camera 210 in a first storage apparatus and/or a second storage apparatus, and store the second image in the second storage apparatus.

In an exemplary embodiment, the processor 250 may tag at least one beacon existing in a first region to a first image based on beacon information, and store the beacon-tagged first image in the second storage apparatus. The processor 250 may store a first image, in which no beacon is tagged, in the first storage apparatus, and store a first image tagged with a beacon, in the second storage apparatus.

In an exemplary embodiment, the processor 250 may tag at least one beacon existing in a second region to a second image based on beacon information. In this case, the processor 250 may store a first image, in which no beacon is tagged, in the first storage apparatus, and store the second image tagged with the beacon, in the second storage apparatus. The processor 250 may generate tag information, match the tag information with the second image, and store the second image with the tag information in the second storage apparatus. The tag information may include beacon information corresponding to the tag. The first storage apparatus may be the storage apparatus 300 outside the image obtaining apparatus 200. The second storage apparatus may be the memory 270 inside the image obtaining apparatus 200.

The processor 250 may perform an image signal processing that improves image quality such as gamma correction, color filter array interpolation, color matrix, color correction, color enhancement, or the like, on the first image and the second image. The processor 250 may obtain image information including object information, location information, time information, or the like by analyzing the first image and the second image. An image information obtaining method is not particularly limited, and various known image processing and analyzing methods may be used.

The processor 250 may receive an image request from the server 400 and extract a condition included in the image request. The condition may include at least one of an object condition, a time condition, and a location (position) condition. The object condition may include beacon identification information set to an object.

In an exemplary embodiment, the processor 250 may receive an image request in advance, generate an event each time when a second image corresponding to the extracted condition is obtained, and transmit the obtained second image to the server 400 in real time. In an exemplary embodiment, the processor 250 may search the memory 270 for a second image corresponding to the extracted condition when an image request is received, and transmit at least one found second image to the server 400.

The processor 250 may transmit at least one of the beacon information, the image information, and the tag information, together with the second image or separately from the second image.

The processor 250 may output a control signal to the camera 210 such that the camera 210 may capture again an image of the first region at all times when the registered or the appointed beacon 100 leaves the first region. In an exemplary embodiment, the processor 250 may output a control signal to the camera 210 such that the camera 210 may capture again an image of the first region at all times when all of the beacons 100 existing in the first region leave the first region.

The processor 250 may transmit beacon information about at least one beacon 100 detected in the first region to another adjacent image obtaining apparatus. The other image obtaining apparatus that has received the beacon information may obtain and store a second image when the beacon is detected in the first region of the other image obtaining apparatus, based on the received beacon information.

The memory 270 may store a beacon signal and beacon information. The memory may store the second image. In the memory 270, beacon information or tag information corresponding to the second image may be matched and stored. At least a portion of the second image and the beacon information stored in the memory 270 may be deleted and/or backed up when a fixed period unit or a fixed storage capacity is exceeded.

The memory 270 may be a module capable of inputting and outputting information such as a hard disk drive, a solid state drive (SSD), a flash memory, a compact flash (CF) card, a secure digital (SD) card, a smart media (SM) card, a multi-media card (MMC) or a memory stick, and be included inside the image obtaining apparatus 200.

The power supply 290 supplies power required for an operation of the camera 210, the beacon sensor 230, the processor 250, and the memory 270. The power supply 290 may supply a preset level of power, and may be recharged or replaced. The power supply 290 may be a battery.

In the embodiment of FIG. 2, the image obtaining apparatus 200 may obtain the first image and the second image by using one camera 210, but the inventive concept is not limited thereto. For example, the camera 210 may be a multi-camera in which two or more cameras are spaced apart by a preset distance. In this case, a camera obtaining the first image may be different from a camera obtaining the second image, or different cameras may simultaneously obtain different second images.

Figure 3:
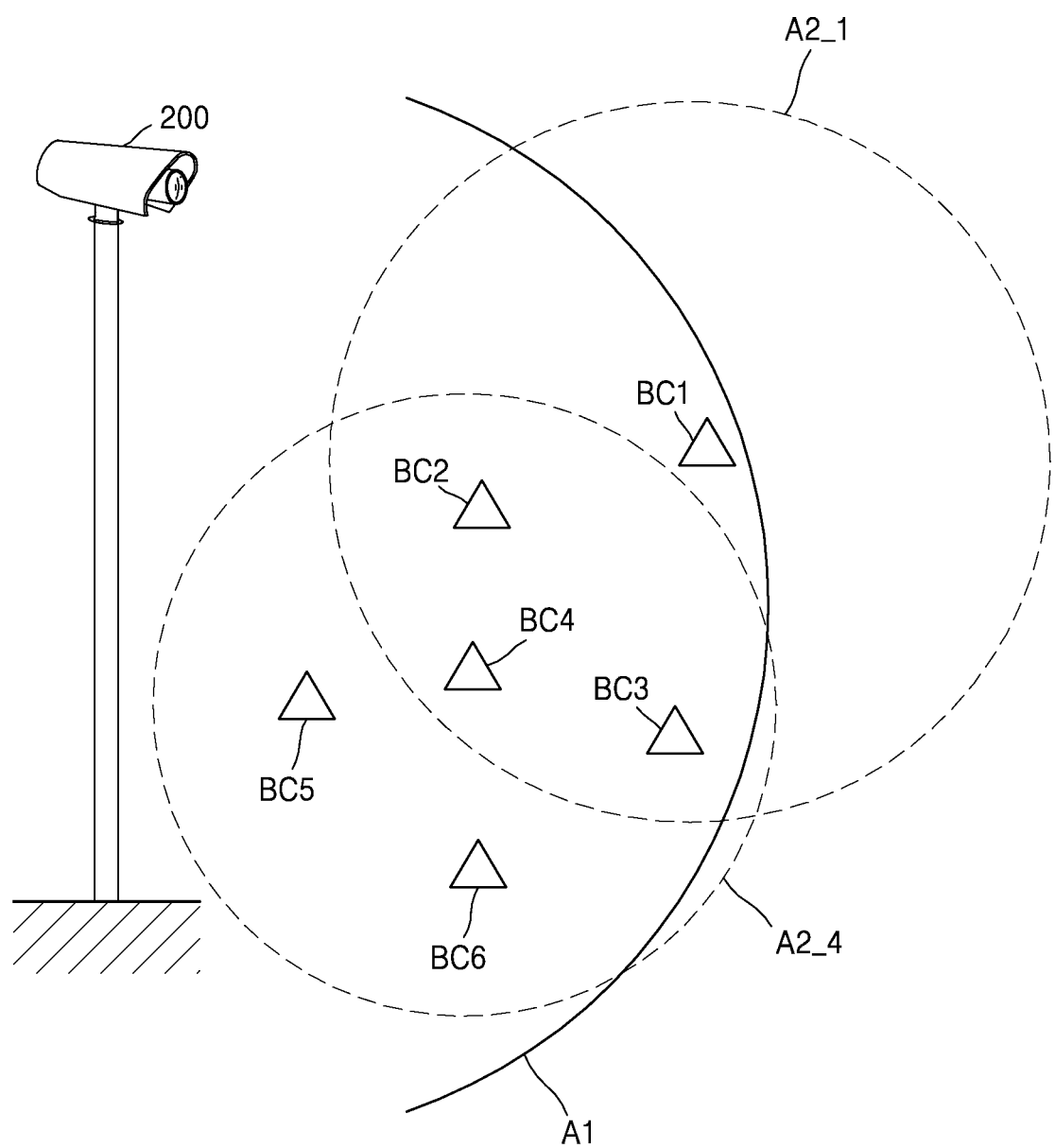
FIGS. 3 through 5 are diagrams for explaining operations of an image obtaining apparatus, according to exemplary embodiments.
Figure 4A:
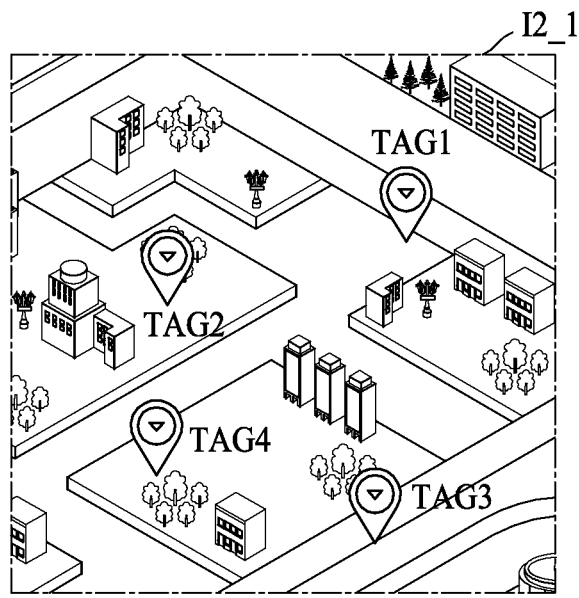
Figure 4B:
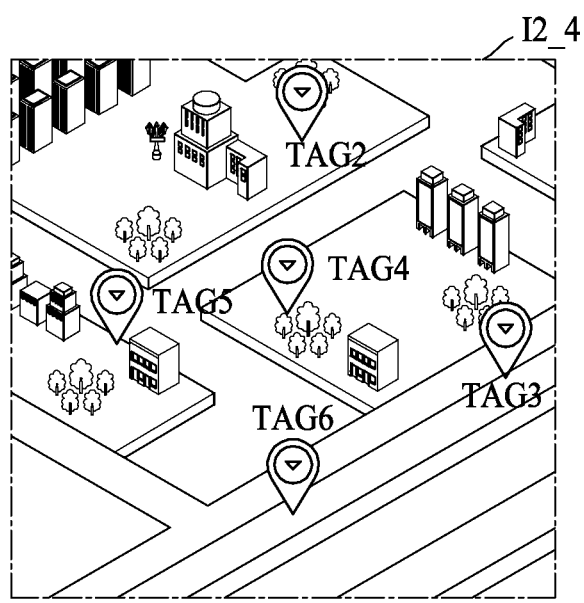
Figure 5:
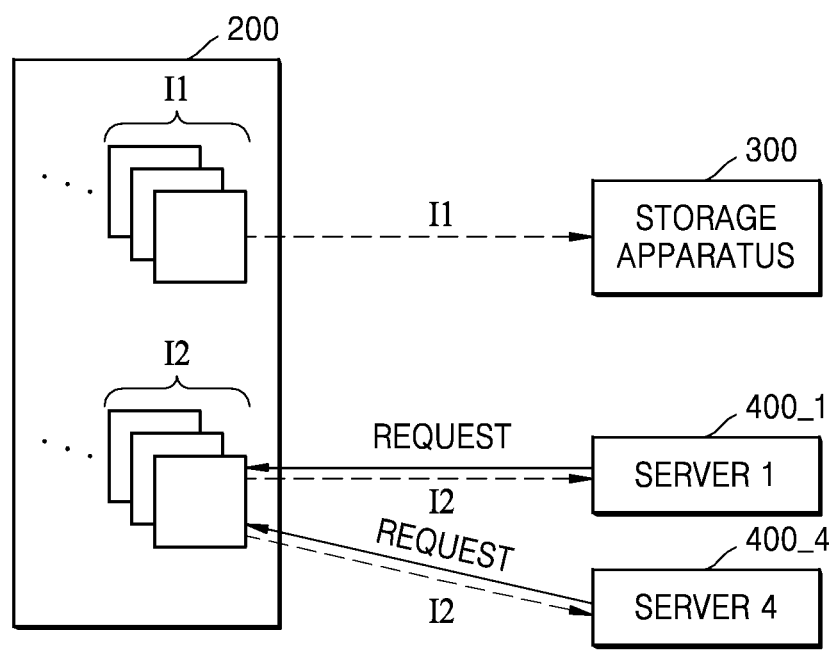

FIGS. 3 through 5 are diagrams explaining operations of the image obtaining apparatus 200 according to an exemplary embodiment. Description will be provided by referring to FIGS. 3 to 5 together.

The camera 210 of the image obtaining apparatus 200 may obtain a first image 11 by capturing an image of a first region A1. The camera 210 may capture an image of the first region A1 according to a preset mode.

The beacon sensor 230 of the image obtaining apparatus 200 may detect beacons BC1 to BC6 by receiving beacon signals transmitted by the beacons BC1 to BC6 in the first region A1.

The processor 250 of the image obtaining apparatus 200 may generate beacon information based on the received beacon signal. The processor 250 may control a posture, that is, PTZ, of the camera 210 based on the beacon information, such that the camera 210 faces each of the beacons BC1 to BC6.

The camera 210 may obtain a second image 12 by capturing an image of a second region including the beacons BC1 to BC6 by using a changed camera posture. Referring to FIG. 3, the camera 210 may obtain second images by capturing images of second regions with respect to the beacons BC1 to BC6, including the second region A2_1 of a predetermined range including a first beacon BC1, the second region A2_4 of a predetermined range including a fourth beacon BC4 or the like. At least some portions of the second images 12 may overlap with one another.

In an exemplary embodiment, the processor 250 may select at least one pre-appointed or registered beacon from among beacons existing in the first region A1 based on beacon information, and control the camera 210 such that the camera 210 obtains a second image 12 only with respect to the appointed or registered beacon.

The processor 250 may store the second image 12 in the memory 270. At this time, the processor 250 may tag at least one of the beacons BC1 to BC6 existing in the second region to the second image 12, and store the beacon-tagged second image 12 in the memory 270.

In an exemplary embodiment, the processor 250 may not generate a second image 12, but may tag at least one beacon of the first region A1 to the first image 11, and store the beacon-tagged first image 11 in the memory 270.

FIG. 4A illustrates an example of setting, to a second image 12_1 with respect to the first beacon BC1, first through fourth tags TAG1 through TAG4 corresponding to the first beacon BC1 existing in the second region A2_1 and beacons around the first beacon BC1, that is, the second beacon to the forth beacon BC2 to BC4.

FIG. 4B illustrates an example of setting, to a second image 12_4 with respect to the forth beacon BC4, second through sixth tags TAG2 through TAG6 corresponding to the fourth beacon BC4 existing in the second region A2_4 and beacons around the forth beacon BC4, that is, the second beacon BC2, the third beacon BC3, the fifth beacon BC5 and the sixth beacon BC6.

The processor 250 may transmit the first image 11 and store the first image 11 in the storage apparatus 300.

The processor 250 may store a second image in the memory 270, and when an image request is received from at least one server 400, the processor 250 may transmit a second image matching a condition included in the image request to the server 400. In the embodiment of FIG. 5, transmission of a second image 12 with respect to image requests from a first server 400_1 and a fourth server 400_4 is shown. Conditions that the first server 400_1 and the fourth server 400_4 respectively request may be the same or different.

Figure 6:
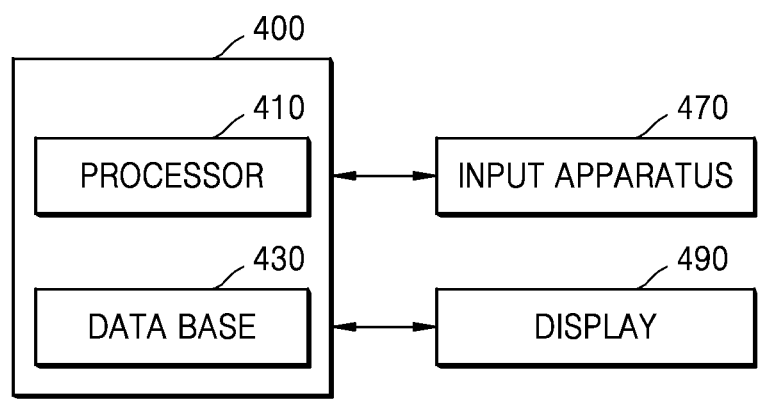
FIG. 6 is a schematic block diagram of a configuration of a server according to an exemplary embodiment.

FIG. 6 is a schematic block diagram of a configuration of a server 400 according to an exemplary embodiment.

Referring to FIG. 6, the server 400 may include a processor 410 and a database 430. The server 400 may further include an input apparatus 470 and a display 490 although FIG. 6 illustrates the input apparatus 470 and the display 490 outside the server 400.

The processor 410 may receive a user input through the input apparatus 470. The user input may be an input for setting a condition. The processor 410 may receive condition information including at least one of an object condition, a time condition and a location (position) condition through the input apparatus 470, and transmit a first image request including the condition information to at least one image obtaining apparatus 200. The object condition may include beacon identification information set to an object. The processor 410 may receive at least one second image corresponding to the condition information from the at least one image obtaining apparatus 200 and output the second image to the display 490. At least one tag may be set to at least one second image output to the display 490. The processor 410 may determine a movement path of the at least one tag by analyzing the at least one the second image.

The processor 410 may receive a second image request from a user terminal 500, and output condition information included in the second image request. The processor 410 may transmit a third image request including condition information to at least one image obtaining apparatus 200, and receive a second image corresponding to the condition information from the at least one image obtaining apparatus 200. The processor 410 may transmit the second image received from the at least one image obtaining apparatus 200 to the user terminal 500.

The processor 410 may transmit a fourth image request including condition information to the storage apparatus 300, and receive a first image corresponding to the condition information. The condition information may include at least one of an object condition, a time condition, and a location (position) condition. The processor 410 may include condition information input by a user through the input apparatus 470, in a fourth image request, and transmit the fourth image request to the storage apparatus 300. The object condition may be an object image.

The processor 410 may primarily quickly obtain an image corresponding to the condition information through a search for a second image by using the image obtaining apparatus 200, and secondarily additionally obtain additional information other than the image corresponding to the condition information through a search for a first image using the storage apparatus 300.

The database 430 may build a database of the first image and the second image, the beacon information and the image information, or the like. The database 430 may index and store the first image and the second image for each beacon (or each tag), each region or each image obtaining apparatus.

The input apparatus 470 may include a keypad, a dome switch, a touchpad (a contact-type capacitance method, a pressure-type resistive overlay method, an infrared detecting method, a surface ultrasonic wave conduction method, an integral-type tension measuring method, a piezo-effect method, or the like), a mouse, a remote control, a jog wheel, a jog switch, or the like.

The display 490 may include a liquid crystal display (LCD), an organic light-emitting diode (OLED), an electrophoretic display (EPD), or the like. The display 490 may be configured in the form of a touch screen such that an input may be received through a user's touch, to thereby operate as a user input interface.

Figure 7:
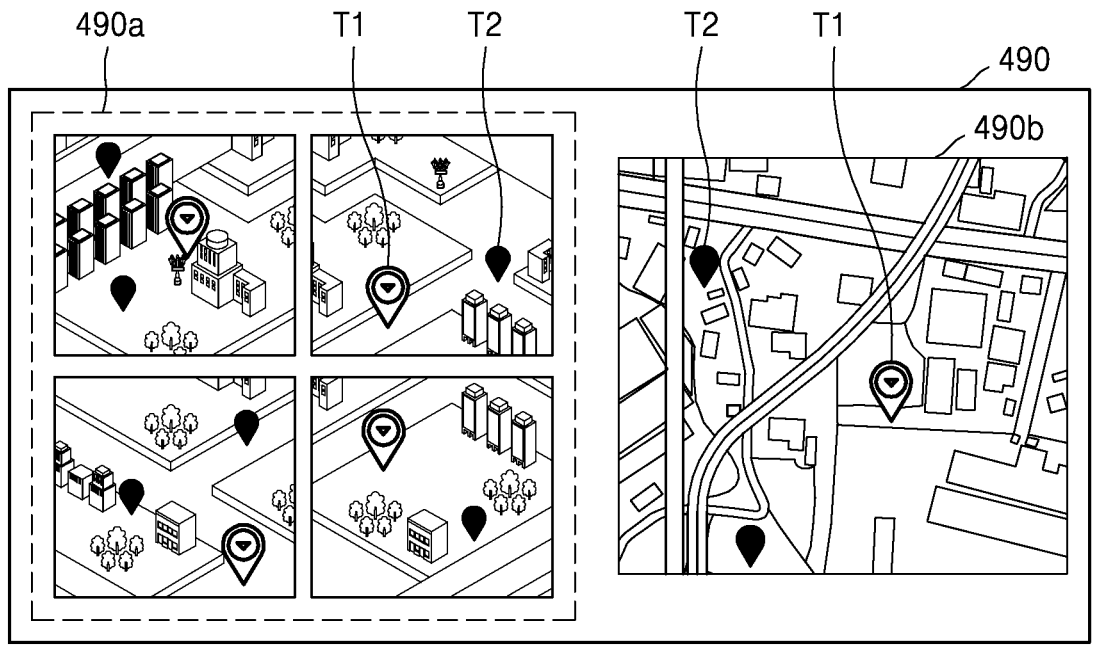
FIG. 7 is an example of a display method of an image output to a display of a server, according to an exemplary embodiment.

FIG. 7 is an example of a display method of an image output to a display 490 of a server 400 according to an exemplary embodiment.

Referring to FIG. 7, the server 400 may provide at least one second image received from the image obtaining apparatus 100 by dividing the second image into portions and displaying the portions in respective regions on a screen of the display 490.

The screen of the display 490 may include a first display region 490a and a second display region 490b. At least one second image set with a tag may be displayed in the first display region 490a. The second display region 490b may be provided with a map including a location which is a background of the second image, and the tag of the second image may be displayed on the map. The tag may include a main tag T1 corresponding to a searched target and a peripheral tag T2 around the main tag T1. The main tag T1 may be distinguished from the peripheral tag T2. The main tag T1 and the peripheral tag T2 may be distinguished from each other by a size, a shape, a color, or the like. The tags may move along respective movement paths on the map provided to the second display region 490b.

In an exemplary embodiment, the server 400 may display one of the first display region 490a and the second display region 490b on the overall screen of the display 490 according to a user's setting.

Figure 8:
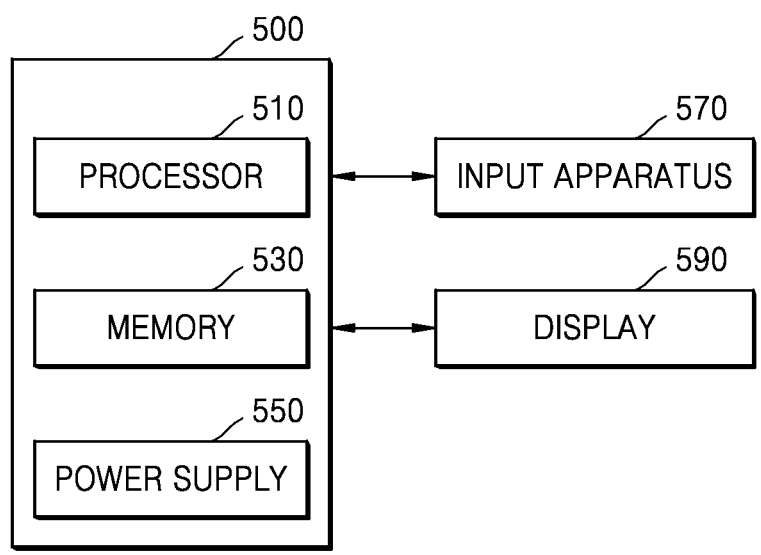
FIG. 8 is a schematic block diagram of a configuration of a user terminal according to an exemplary embodiment.

FIG. 8 is a schematic block diagram of a configuration of a user terminal 500 according to an exemplary embodiment.

Referring to FIG. 8, the user terminal 500 may include a processor 510, a memory 530, and a power supply 550. The user terminal 500 may further include an input apparatus 570 and a display 590 although FIG. 8 illustrates the input apparatus 570 and the display 590 outside the user terminal 500.

The processor 510 may download and install an application from the server 400 or an additional application server. The processor 510 may receive a user input through the input apparatus 570 when the application is executed. The user input may be an input for setting a condition. The processor 510 may receive condition information including at least one of an object condition, a time condition, and a location (position) condition through the input apparatus 570, and transmit a second image request including the condition information to the server 400. The object condition may include beacon identification information set to an object.

The processor 510 may receive at least one of a first image and/or a second image corresponding to the condition information from the server 400, and output the same to the display 590. The second image output to the display 590 may be set with at least one tag. When a user selects a tag, tag information may be provided around the tag in a pop-up window.

The processor 510 may provide a map on a screen of the display 590 and display the tag in the map. The processor 510 may automatically download a map including a region (location) corresponding to a background of the second image.

The memory 530 may store the first image and/or the second image, beacon information, image information or the like.

The input apparatus 570 may include a keypad, a dome switch, a touchpad (a contact-type capacitance method, a pressure-type resistive overlay method, an infrared detecting method, a surface ultrasonic wave conduction method, an integral-type tension measuring method, a piezo-effect method, or the like), a mouse, a remote control, a jog wheel, a jog switch, or the like.

The display 590 may include a liquid crystal display (LCD), an organic light-emitting diode (OLED), and an electrophorestic display (EPD), or the like. The display 590 may be configured in the form of a touch screen such that an input may be received through a user's touch, to thereby operate as a user input interface.

Figure 9A:
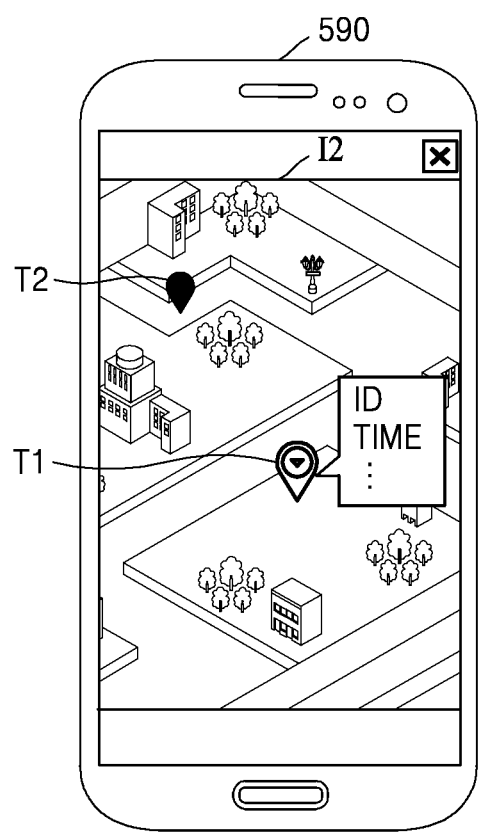
FIGS. 9A through 9C show an example of a method of displaying an image output to a display of a user terminal, according to exemplary embodiments.
Figure 9B:
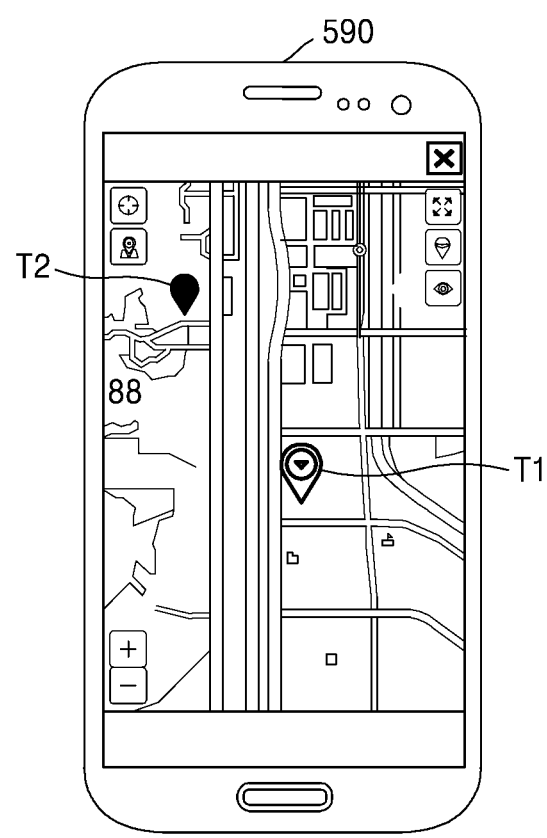
Figure 9C:
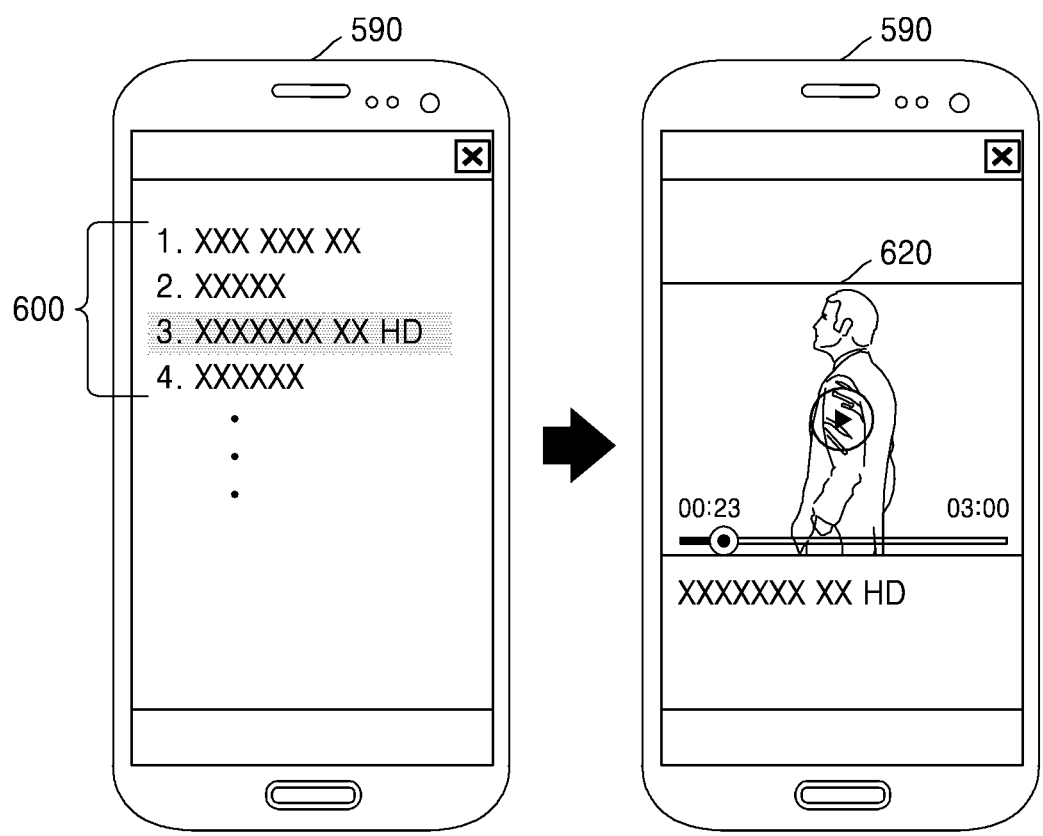

FIGS. 9A through 9C show an example of a method of displaying an image output to a display 590 of a user terminal 500 according to an exemplary embodiment.

Referring to FIG. 9A, the user terminal 500 may receive at least one of second image 12 from the server 400 in real time and provide the second image 12 to a screen of the display 590. When a user selects a tag, tag information (ID, time or the like) may be provided around the selected tag in a pop-up window.

Referring to FIG. 9B, the user terminal 500 may provide a map corresponding to a background of the second image on the screen of the display 590, and display the tag on the map based on the tag information also received from the server 400.

The tag may include a main tag T1 corresponding to a searched target and a peripheral tag T2 around the main tag T1. The main tag T1 may be distinguished from the peripheral tag T2. The main tag T1 and the peripheral tag T2 may be distinguished by a size, a shape, a color or the like. The tags may move along respective movement paths on the map provided in the second display region 490b.

Referring to 9C, the user terminal 500 may provide a list 600 of the first image and/or the second image received from the server 400 on the screen of the display 590. The user may select one image 620 from the list 600, and the selected image 620 may be provided in a reproducible format.

Figure 10:
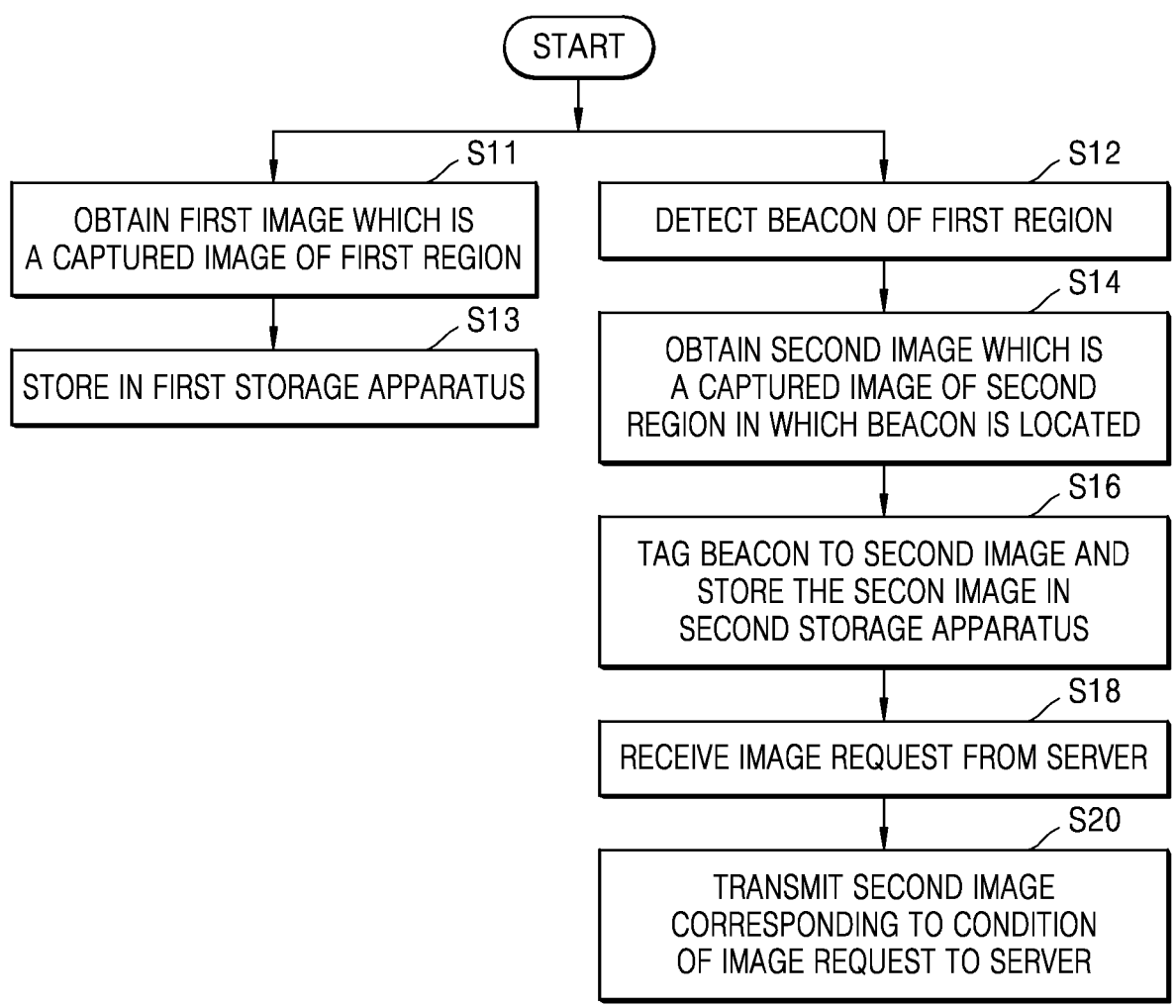
FIG. 10 is a flowchart of an image obtaining method of an image obtaining apparatus, according to an exemplary embodiment.

FIG. 10 is a flowchart of an image obtaining method of an image obtaining apparatus 200 according to an exemplary embodiment. The method according to the embodiment of FIG. 10 may be performed by using the image obtaining apparatus 200 shown in FIGS. 1 and 2.

The image obtaining apparatus 200 may obtain a first image obtained by capturing an image of a set first region at all times (S11). The image obtaining apparatus 200 may transmit the first image to a first storage apparatus to store the first image in the first storage apparatus (S13). The first storage apparatus may be a storage apparatus 300 outside the image obtaining apparatus 200.

The image obtaining apparatus 200 may detect at least one of a beacon by receiving beacon information transmitted from a first region during capturing an image of the first region (S12). The image obtaining apparatus 200 may obtain a second image obtained by capturing an image of a second region in which each beacon is located (S14). The image obtaining apparatus 200 may tag at least one beacon which exists in the second region, to the second image, and store the second image and the tag information in a second storage apparatus (S16). The second storage apparatus may be a memory 270 inside the image obtaining apparatus 200.

The image obtaining apparatus 200 may receive an image request from the server 400 (S18), and transmit a second image corresponding to a condition included in the image request to the server 400.

In an exemplary embodiment, the image obtaining apparatus 200 may previously receive an image request from the server 400, generate an event when a second image corresponding to the condition is obtained, and transmit the second image to the server 400 in real time. For example, the image obtaining apparatus 200 may be set to transmit the second image when a particular object is detected from the server 400, and may generate an event when the particular object is detected from beacon information generated based on a beacon signal.

In an exemplary embodiment, when the image obtaining apparatus 200 receives an image request from the server 400, the image obtaining apparatus 200 may search for a second image corresponding to a condition from among second images stored in the memory 270, and transmit the second image to the server 400.

Although not shown in the drawings, the image obtaining apparatus 200 may tag at least one beacon detected from the first region, to the first image, and store the first image, to which the beacon is tagged, in the second storage apparatus. In this case, the image obtaining apparatus 200 may omit generation of a second image. The image obtaining apparatus 200 may also transmit and store a first image not tagged with a beacon, in the first storage apparatus.

Figure 11:
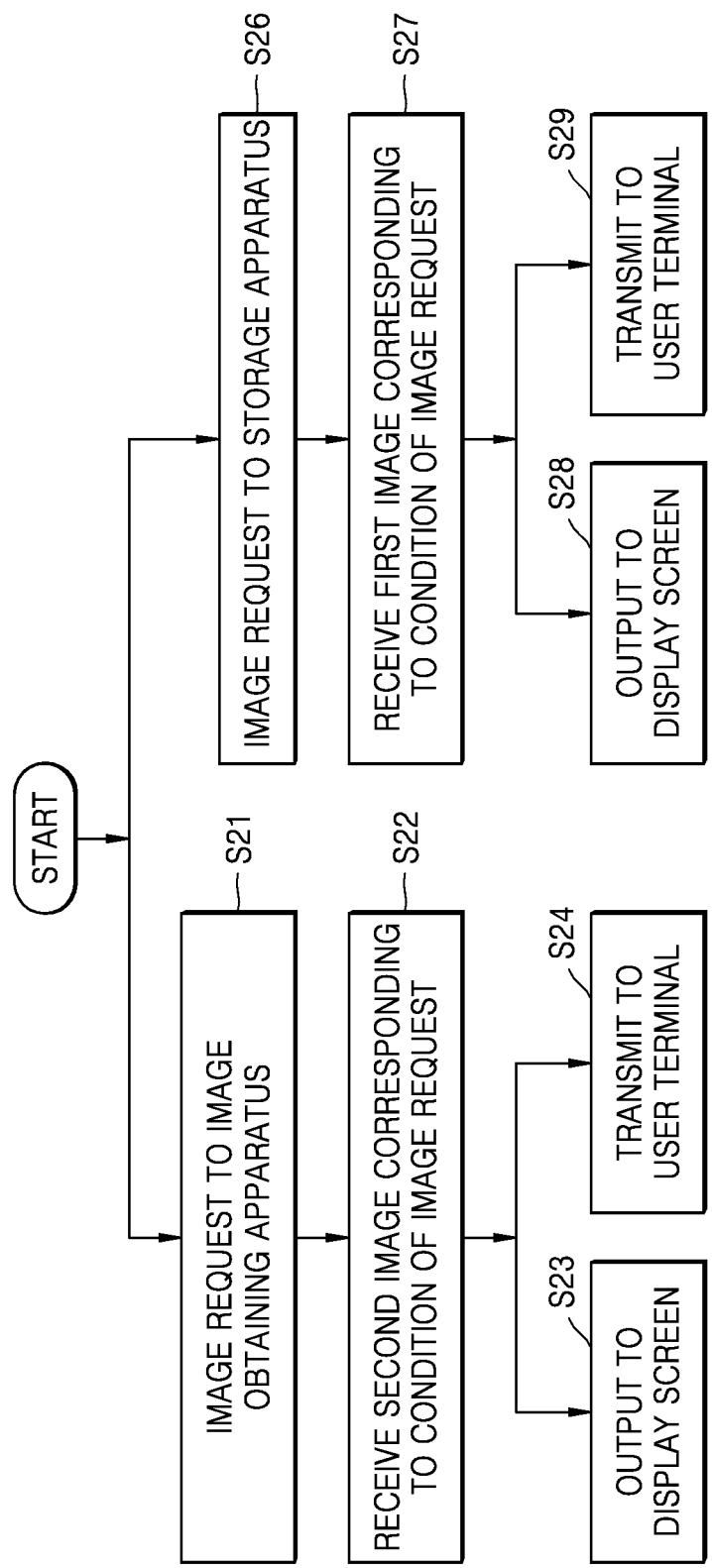
FIG. 11 is a flowchart of an image processing method of a server, according to an exemplary embodiment.

FIG. 11 is a flowchart of an image processing method of a server 400 according to an exemplary embodiment. The method of embodiment of FIG. 11 may be performed on the server 400 shown in FIGS. 1 and 6.

The server 400 may request an image to the image obtaining apparatus 200 (S21), and receive a second image corresponding to a condition of the image request from the image obtaining apparatus 200 (S22).

In an exemplary embodiment, the server 400 may receive a second image corresponding to a previously registered condition from the image obtaining apparatus 200 in real time, and output the second image to a display screen (S23) or transmit the second image to the user terminal 500 (S24).

In an exemplary embodiment, according to a user input or an image request from the user terminal 500, the server 400 may receive at least one second image extracted by the image obtaining apparatus 200 by performing a conditional search on the memory 270, output the second image to the display screen (S23) or transmit the second image to the user terminal 500 (S24).

The server 400 may request an image to the storage apparatus 300 (S26), and receive a first image corresponding to a condition of the image request from the storage apparatus 300 (S27). At this time, the storage apparatus 300 or the server 400 may extract at least one first image corresponding to a condition or at least a portion of the at least one first image by analyzing the first images.

According to a user input or an image request from the user terminal 500, the server 400 may output the first image or the portion of the first image extracted by performing a conditional search on the storage apparatus 300, to the display screen (S28) or transmit the extracted first image or the portion of the first image to the user terminal 500 (S29).

Although not shown in the accompanying drawings, the server 400 may receive a first image tagged with at least one beacon extracted by the image obtaining apparatus 200 by performing a conditional search on the memory 270, from the image obtaining apparatus 200, output the first image to the display screen or transmit the first image to the user terminal 500. In this case, the server 400 may omit searching the storage apparatus 300.

Figure 12:
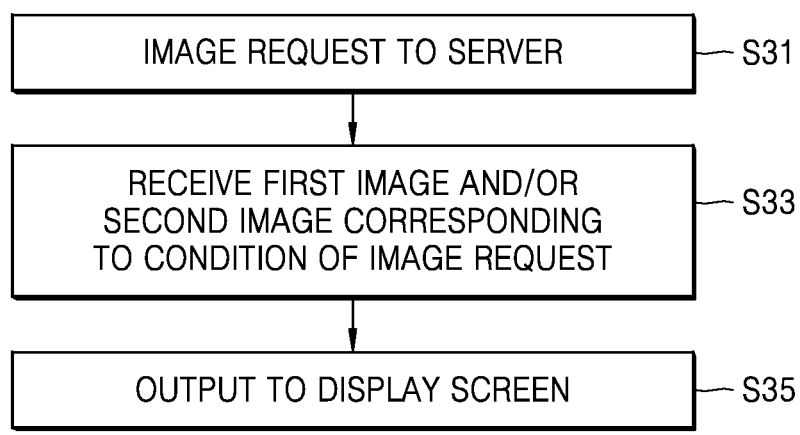
FIG. 12 is a flowchart of an image processing method of a user terminal, according to an exemplary embodiment.

FIG. 12 is a flowchart of an image processing method of a user terminal according to an exemplary embodiment. The method of embodiment of FIG. 12 may be performed on using the user terminal 500 shown in FIGS. 1 and 8.

The user terminal 500 may transmit, to the server 400, an image request including a condition according to a user input (S31).

The user terminal 500 may receive a first image and/or a second image corresponding to the condition of the image request from the server 400 (S33) and output the first image and/or the second image to the display screen (S35). The first image is an image stored in the storage apparatus 300 outside the image obtaining apparatus 200. The second image is an image stored in the memory inside the image obtaining apparatus 200. A background of the second image may include a portion of a background of the first image.

A beacon sensor (a beacon scanner) of the related art determines whether a signal is present or an ID of the signal by just receiving the signal, and may determine a surrounding situation through images of cameras nearby in conjunction with the camera by a manual operation or by using a separate system of a central control center. In this case, a complicated setting is required due to replacement of a beacon scanner or a camera, and also, there is the inconvenience that a new setting is to be made according to a change of the central control center which controls the complicated setting. In addition, a wired or a wireless communication unit from the beacon scanner to the central control center is required even if a beacon scanner is separately installed.

According to an exemplary embodiment, by adding a beacon scan function to a camera, a beacon signal that is received may be processed as an alarm and logged such that an image with respect to a required beacon signal may be easily reproduced and a surrounding situation around the beacon signal may be checked from the image.

According to an exemplary embodiment, as an image storing beacon information obtained by using the image obtaining apparatus is stored in the image obtaining apparatus, one or more external searching apparatuses (e.g. a server) may directly access an image obtaining apparatus to search for a necessary image. Therefore, by storing an image obtained by using the image obtaining apparatus in a set external apparatus, a search for an image may be made conveniently and quickly compared to when an image search is possible only on an external apparatus storing images.

According to an exemplary embodiment, a quick primary search may be made by searching a memory of the image obtaining apparatus, and additional information may be obtained later by a second search by searching an external storage apparatus if necessary. Thus, a search efficiency may be increased.

According to an exemplary embodiment, an effective security system may be operated by storing a record of receiving a beacon signal from a beacon given to the socially weak and applying the record of the received beacon signal to close protection to find when old people with dementia go missing or to help women safely return home. In addition, an image obtaining apparatus according to the embodiments may be installed in passages of a conventional market and beacons may be installed in fire detectors throughout the passages, and when a fire breaks out, a fire alarm and a corresponding image may be immediately delivered to a central control center through transmission of a beacon signal, thereby allowing to determine the situation of the fire in real time. When the fire detector is a fire alarm that has no communication unit, the image obtaining apparatus according to the exemplary embodiments may act as a communication unit that notifies the central control center of the alarm.

According to the exemplary embodiments described above, a monitoring system capable of efficiently monitoring a monitoring target and a control method thereof may be provided.

The image obtaining method and the image processing method according to the exemplary embodiments can be implemented as a computer-readable code on a computer-readable recording medium. The computer-readable recording medium is any recording apparatus that can store data which can be read by a computer system. Examples of the computer-readable recording medium include read-only (ROM), random-access memory (RAM), a CD-ROM, magnetic tapes, floppy disks, and optical data storage devices, etc. In addition, the computer-readable recording medium may be distributed over connected computer systems by a network so that the computer readable code is stored and executed in a distributed fashion. Further, functional programs, codes, and code segments for implementing the present disclosure may be easily inferred by programmers skilled in the art to which the present disclosure pertains.

It should be understood that the exemplary embodiments described herein should be considered in a descriptive sense only and not for purposes of limitation. Descriptions of features or aspects within each embodiment should typically be considered as available for other similar features or aspects in other embodiments.

While the exemplary embodiments have been described with reference to the figures, it will be understood by those of ordinary skill in the art that various changes in form and details may be made therein without departing from the spirit and scope of the inventive concept as defined by the following claims.

What is claimed is:

1. An image obtaining apparatus comprising:
   a housing;
   a camera arranged at a fixed position of a particular location to periodically capture a first image of a first region;
   a beacon sensor;
   the beacon sensor obtaining beacon information by detecting a beacon attached on an object existing in a the first region;
   the camera being controlled by a processor to change its posture according to the beacon detection;
   the processor configured to control the camera to change its posture to a second region corresponding to a position of the beacon according to the beacon detection, capture a second image of the second region, and generate beacon information based on the beacon signal, and tag the beacon with the second image based on the beacon information;
   a memory in the housing configured to store the second image matched with the beacon information, wherein the processor is further configured to transmit the second image to a user terminal or server, in response to an image request from the user terminal or server, respectively, and the processor transmitting the first image to an external storage apparatus away from the user terminal or server.

2. The image obtaining apparatus of claim 1, wherein the processor is further configured to generate an event when a registered beacon is detected based on the beacon information, and transmit from the image obtaining apparatus, to an external apparatus, an image matched with the beacon information corresponding to the registered beacon.

3. The image obtaining apparatus of claim 1, wherein the beacon information comprises information about a distance between the image obtaining apparatus and the beacon.

4. The image obtaining apparatus of claim 1, wherein the processor transmits from the image obtaining apparatus, at least a portion of the image stored in the memory to an external storage apparatus, at fixed time periods.

5. The image obtaining apparatus of claim 1, wherein the processor transmits from the image obtaining apparatus, at least a portion of the image stored in the memory to an external storage apparatus, when the image stored in the memory exceeds a preset storage capacity.

6. The image obtaining apparatus of claim 1, wherein the processor is further configured to set a priority to the beacon and control a direction of the camera such that an image of the monitoring region is captured according to the priority.

7. The image obtaining apparatus of claim 1, wherein the second regionincludes at least a portion of the first region and the second region includes a region including a position of the beacon existing in the first region.

8. The image obtaining apparatus of claim 1, wherein the processor is further configured to receive the image request from the server, and transmit to the server, the second image matched with the beacon information corresponding to condition information included in the image request.

9. The image obtaining apparatus of claim 1, wherein the processor transmits from the image obtaining apparatus, an image which is not matched with the beacon information, from among captured images of the monitoring region, to the external storage apparatus.

10. An image obtaining apparatus comprising:
    a camera configured to capture a first image of a first region which is a preset region;
    a beacon sensor configured to detect a beacon attached to an object by receiving a beacon signal from the beacon;
    the camera being controlled by a processor to change its posture according to the beacon detection;
    the processor configured to control the camera to capture a second image of a second region in response to the beacon sensor detecting the beacon in the first region, generate beacon information based on the beacon signal, and tag the beacon with the second image based on the beacon information;
    the second region including at least a portion of the first region, and the second region including a region including a position of the beacon existing in the first region;
    a memory configured to store the second image tagged with the beacon, wherein the beacon information comprises at least one of identification information about the beacon, position information about the beacon, time information indicating a time at which the beacon is detected by the beacon sensor, identification information about the image obtaining apparatus, and identification information about a user terminal which transmits an image request corresponding to the second image;

the processor receiving the image request from the user terminal or server;

the processor, and not a user, searching for the second image when the image request corresponds to the identification information about the beacon; and the processor transmitting the second image to the user terminal or server, in response to the image request from the user terminal or server, respectively, and the processor transmitting the first image to an external storage apparatus.

11. The image obtaining apparatus of claim 10, wherein the processor controls the camera to take an original posture prior to being directed to the second region, and the processor directs the camera to the second region to capture the second image by at least one of pan, tilt and zoom operations, and resumes capturing the first image when the beacon leaves the first region.

12. The image obtaining apparatus of claim 10, wherein the second region comprises a plurality of second regions in which a plurality of beacons exist, wherein the processor is configured to control the camera to capture respective second images of the second regions in response to the beacon sensor detecting the beacons according to an image capturing sequence set based on priorities among the second regions or locations of the beacons.

13. An image processing apparatus comprising:

a processor configured to receive an image request from a user terminal;

the processor requesting an image corresponding to condition information included in the image request, to an external image obtaining apparatus and an external storage apparatus outside the image obtaining apparatus;

the processor receiving a first image corresponding to the condition information, from the external storage apparatus, and a second image corresponding to the condition information, from the external image obtaining apparatus, and transmitting the first image and the second image corresponding to the condition information, to the user terminal; and a database configured to store the first image received from the external storage apparatus and the second image received from the external image obtaining apparatus, wherein:

the first image is an image of a preset first region captured by the external image obtaining apparatus and stored in the external storage apparatus, and the second image is an image captured by the external image obtaining apparatus in a direction facing a beacon existing in the first region, matched with beacon information and stored in an internal memory of the external image obtaining apparatus.

14. The image processing apparatus of claim 13, wherein the processor is further configured to display at least one another beacon around the beacon corresponding to the condition information, on the map, and wherein the beacon corresponding to the condition information and the at least one another beacon are distinguished by at least one of a size, a shape, and a color.

15. An image obtaining apparatus comprising:

a camera arranged at a fixed position of a particular location to periodically capture a first image of a first region which is a preset region;

a beacon sensor configured to detect a beacon attached to an object existing in the first region by receiving a beacon signal from the beacon;

a processor configured to control the camera to change its posture to a second region corresponding to a position of the beacon according to the beacon detection, capture a second image of the second region, generate beacon information based on the beacon signal, and tag the beacon with the second image based on the beacon information;

a memory configured to store the second image tagged with the beacon, wherein the beacon information comprises at least one of identification information about the beacon, position information about the beacon, time information indicating a time at which the beacon is detected by the beacon sensor, identification information about the image obtaining apparatus, and identification information about a user terminal which transmits an image request corresponding to the second image;

the processor receiving the image request from the user terminal or server;

the processor, and not a user, searching for an image corresponding to condition information included in the image request from among first image and the second image; and the processor transmitting the image to the user terminal or server, in response to the image request from the user terminal or server, respectively.

16. A monitoring system comprising:

a first image obtaining apparatus;

a second image obtaining apparatus;

a server;

an external storage apparatus;

the first image obtaining apparatus comprising:
 a housing,
 a camera,
 a beacon sensor, and
 a processor;

the beacon sensor obtaining beacon information by detecting a beacon attached on an object existing in a monitoring region;

the processor configured to match the beacon information with an image of the monitoring region captured by the camera; and a memory in the housing configured to store the image matched with the beacon information, wherein the processor is further configured to transmit the beacon information to the second image obtaining apparatus, wherein:

the processor is configured to receive an image request from the server, and transmit to the server, the image matched with the beacon information corresponding to condition information included in the image request, and the processor is further configured to transmit from the first image obtaining apparatus, an image which is not matched with the beacon information, from among captured images of the monitoring region, to the external storage apparatus.

* * * * *